United States Patent
Bose et al.

(10) Patent No.: US 7,366,134 B2
(45) Date of Patent: Apr. 29, 2008

(54) DYNAMIC ALLOCATION OF NETWORK RESOURCES IN A MULTIPLE-USER COMMUNICATION SYSTEM

(75) Inventors: Pratik Bose, Bethesda, MD (US); Dilip S. Gokhale, Montgomery Village, MD (US); Ajai Kaul, Germantown, MD (US); Udayan Narayan Borkar, Germantown, MD (US)

(73) Assignee: Comsat Corporation, Bethesda, MD (US)

( * ) Notice: Subject to any disclaimer, the term of this patent is extended or adjusted under 35 U.S.C. 154(b) by 679 days.

(21) Appl. No.: 10/362,560

(22) PCT Filed: Aug. 17, 2001

(86) PCT No.: PCT/US01/22600

§ 371 (c)(1),
(2), (4) Date: Dec. 30, 2003

(87) PCT Pub. No.: WO02/17107

PCT Pub. Date: Feb. 28, 2002

(65) Prior Publication Data

US 2004/0107281 A1 Jun. 3, 2004

(51) Int. Cl.
*H04Q 7/00* (2006.01)

(52) U.S. Cl. .......... 370/329; 370/348; 370/468
(58) Field of Classification Search ............ None
See application file for complete search history.

(56) References Cited

U.S. PATENT DOCUMENTS

| 3,644,678 | A | * | 2/1972 | Schmidt | 370/322 |
|---|---|---|---|---|---|
| 4,256,925 | A | * | 3/1981 | Goode | 370/322 |
| 4,322,845 | A | * | 3/1982 | Fennel et al. | 370/321 |
| 4,763,325 | A | * | 8/1988 | Wolfe et al. | 370/322 |
| 5,596,576 | A |  | 1/1997 | Milito |  |
| 5,719,854 | A |  | 2/1998 | Choudhury et al. |  |
| 5,996,013 | A |  | 11/1999 | Delp et al. |  |
| 6,097,733 | A |  | 8/2000 | Basu et al. |  |
| 6,226,521 | B1 | * | 5/2001 | Liu et al. | 455/453 |
| 6,243,580 | B1 |  | 6/2001 | Garner |  |
| 6,377,561 | B1 | * | 4/2002 | Black et al. | 370/330 |

OTHER PUBLICATIONS

Powell et al, Demand Assignment Multiple Access and Dynamic Channel Allocation Strategies for Integrating Radio Dispatch and Telephone Services Over Mobile Satellite Systems, IEEE, pp. 1020-1027, 1992.*

* cited by examiner

*Primary Examiner*—Frank Duong
(74) *Attorney, Agent, or Firm*—Sughrue Mion, PLLC

(57) ABSTRACT

In a multiple-user network communication system such as a satellite-based system, or in cable or wireless systems, the system resources, such as bandwidth, code allocation, and or slot timing, are allocated to users based in part on their class of service. The allocation provides for immediate allocation of the requested resources to a user having a verified high class of service so long as the resources are abatable or can be made available by tapping a resource reserve. If only a portion of the requested resources are available, they are made available immediately. From time to time, the resources available to at least one class of service are allocated among the users of that class of service, either equally, equally up to the requested resources, equitably, or in some systematic manner.

8 Claims, 6 Drawing Sheets

| 1 | 2 | 3 | 4 | 5 | 6 | 7 | 8 | 9 |
|---|---|---|---|---|---|---|---|---|
| | 0th ITERATION | | | | | | | |
| USER | REQUESTED RESOURCES | AFTER FIRST CYCLE | AFTER SECOND CYCLE | AFTER THIRD CYCLE | AFTER FOURTH CYCLE | AFTER FIFTH CYCLE | AFTER SEVENTH CYCLE | ALLOCATION OF REMAINDER |
| a | 5 | 4 | 3 | 2 | 1 | 0 | 0 | |
| b | 7 | 6 | 5 | 4 | 3 | 2 | 2 | |
| c | 9 | 8 | 7 | 6 | 5 | 4 | 3 | |
| d | 10 | 9 | 8 | 7 | 6 | 5 | 5 | |
| e | 12 | 11 | 10 | 9 | 8 | 7 | 7 | 2 |
| f | 14 | 13 | 12 | 11 | 10 | 9 | 7 | |
| CORRESPONDING TOTAL RESOURCES | 44 | 38 | 32 | 26 | 20 | 14 | 2 | |

FIG. 4

DYNAMIC ALLOCATION OF NETWORK RESOURCES IN A MULTIPLE-USER COMMUNICATION SYSTEM

FIELD OF THE INVENTION

This invention relates to network communication systems shared by many users, and more particularly to methods for the operation of such systems for allocation of system resources.

BACKGROUND OF THE INVENTION

Some satellites provide relay service for transmission of television programs from a source to various user locations, as for example from network facilities in New York to the midwest and to the west coast of the US, so that local television broadcasters can simultaneously transmit the same program over large portions of the continental US. In such systems, there is a single user who uses a dedicated portion of a channel. The bandwidth allocated to that user is not used by other services or users. Thus, there is no need to schedule among users, because the single user has exclusive use of a given portion of the satellite resources.

In satellite, cable, or wireless network communications systems in which diverse services are offered to many users, a problem arises in the allocation of the available network resources among the various users. For example, in the Internet, there is always competition among the users, which can result in reduced service for all users. In satellite, cable and wireless networks intended for specific services, including internet access, the system operator may desire to provide some users of the system with preferential service. For example, in satellite television relaying services, there might be a given number of transponders, and some users might contract for the right to "bump" other users off their allocated transponders if the preferred user's transponder failed.

In wireless cell-phone services different factors are at work, because multiple users at various times demand and relinquish access to the available network resources, and the network must allocate the available resources among those users currently using the system or demanding access thereto. Ideally, each new user demanding access could be accommodated immediately. However, it is uneconomical to provide sufficient resources so that all users can access the network simultaneously. Efficiency requires that sufficient resources be available to provide satisfactory service most of the time, with the understanding that under unusual circumstances, or occasionally, some potential users will be unable to access the system. In cell phones networks, the allocation of system resources is immediate. That is, when a user demands cell-phone service, the network responds immediately, if resources are available, as for example with one audio channel. When resources are not available, the user is advised to wait and try again.

In the case of satellite, cable and wireless communications providing multiple service classes to a large number of users, additional problems of allocation arise.

SUMMARY OF THE INVENTION

A method according to one mode of the invention is for operating a communication network, the resources of which are shared among a plurality of users sharing network resources in a single-class system, or in at least one class of a multiple-class system. The method comprises the steps of (a) responding to requests from (i) a new user for network resources or (ii) from a current user for additional network resources by making the requested resources immediately available to that user and (b) from time to time, readjusting the resources allocated among all users of the network. In a particular version of this mode of the invention, the step of readjusting includes the step of tending to allocate equal amounts of the network resources to each of the users of the network. In another particular version of this mode, the step of readjusting includes the step of allocating equal amounts of the network resources to each of the users, so long as no user receives more network resources than it has requested. In yet another version, the step of readjusting allocates resources among the current users in amounts which are responsive to the amount of resources that each has requested. In yet another version, the step of readjusting includes the step of performing the readjustment on a rolling basis, so that not all of the users are readjusted at the same time, but rather over several readjustment intervals. In yet a further version of this mode, a reserve of unused resources is maintained, so that resources are available for immediate use.

A method according to an aspect of the invention is for operating a network with a plurality of shared users sharing network resources. The method includes the step of responding to requests for additional network resources from any user in a class by making the requested resources immediately available, and taking at least a portion of the resources from a resource reserve or pool, if necessary. Also, the method includes the step of, from time to time, reallocating the resources allocated to a given class of service among all users of that class of service of the network. The reallocation may include the step of adjusting the resource allocation so as to tend to maintain a reserve of network resources which are available for immediate allocation. The reallocation may be made on a rolling basis, so that all of the users are not reallocated simultaneously, but over a period of at least two reallocation subintervals, all the users are reallocated.

A method according to another aspect of the invention is for dynamically allocating network resources in a communication network having a plurality of shared users. This method comprises the step of receiving a new request for specified network resources from a user entitled to a given class of service. According to this method, the new request results in a response which verifies that the user is entitled to the specified network resources. If the user is entitled to the specified network resources, a determination is made to see if the specified network resources are available. In association with the step of determining, if the specified network resources are available, immediately allocating to the user the specified network resources, and if the specified resources are not available, immediately reallocating to the user, from a network resource reserve, if necessary, sufficient network resources to make up the specified network resources. If the specific resources are not fully available, immediate allocation is made to the user of so much of the resources as are available. In this method, from time to time, the network resources within at least one class of service (or within the only class of service in a single-class system) are reallocated to tend to (a) allocate the network resources available within each class of service equally among all users, except (b) not exceeding the requested amount of the resources for any user. In yet a further version of this method, a reserve of unused resources is maintained, so that resources are available for immediate use. The reallocation may be made on a rolling basis, so that not all users are reallocated at one time, but all users are reallocated over some number of reallocation sub-intervals.

In a particular version of this method according to another aspect of the invention, if the step of verifying indicates that the requesting user is entitled to use the requested specific resources, the specific resources requested by a requesting user are recorded.

A method according to another avatar of the invention is for dynamically allocating network resources in a communication network having a plurality of shared users, the method according to this another avatar includes the step of receiving a new request for specified network resources from a user entitled to a given class of service. In response to the new request, a verification is made that the user is (or is not, as the case may be) entitled to the specified network resources. If the user is entitled to the speed network resources, a determination is made to see if the specified network resources are available. If the specified network resources are available, the specified network resources are immediately allocated to the user. Ideally, the required resources would be made available from a pool of unused resources. If the specified resources are not available, sufficient network resources are immediately reallocated to the user, by taking from a network resource reserve, to make up the specified network resources. If the specific resources are not fully available notwithstanding the reserve, so much of the resources as are available are immediately allocated to the user. In this method according to another avatar of the invention, from time to time, the network resources are reallocated within at least one class of service to tend to (a) allocate the network resources within that class of service equally among all users, except (b) not exceeding the requested amount of the resources for any user. This reallocation from time to time may be periodic or aperiodic. The reallocation may include the step of allocating the resources among the users in such a way as to leave a pool of unallocated resources which is available for immediate allocation to new users or users requesting additional resources. In a particular version of this avatar, a step of recording the specified resources and the identity of the requesting user are recorded after the step of determining. The reallocation may be made on a rolling basis, so that all users do not have their network resources reallocated at the same time, but all users are reallocated over a period of two or more reallocation sub-intervals.

According to another hypostasis of the invention, a method for dynamically allocating network resources in a communication network having a plurality of shared users includes the step of receiving a request for modified allocation of network resources from a current network user entitled to a given class of service. If the request is for reduction in the network resources allocated to the user, the network resources allocated to the user are immediately reduced. If the request is for an increase in the network resources, a further step is used to verify that the user is entitled (or not entitled) to the increased network resources. If the request is for an increase in the network resources, and if the specified network resources are available, the specified network resources are immediately allocated to the user. If the request is for an increase in the network resources, and the specified resources are not available, sufficient network resources are immediately reallocated to the user, from a network resource reserve, to make up the specified network resources. If the request is for an increase in the network resources, and if the specific resources are not fully available, so much of the resources as are available are immediately allocated to the user. In this other hypostasis, the network resources are, from time to time, reallocated to tend to equalize the usage of the network resources among users having the same class of service. In this hypostasis, the further step may be made of recording the network resources requested by the user, together with the user's identity. In any multiple-class system, the step may be made of allocating the total amount of network resources among the various classes of service, so that each class of services has a given amount of network resources, which may differ among the various classes. Within each class of service, at least some of the users entitled to that class of service may be allocated equal amounts of the network resources.

According to another method is for operating a user terminal in a communication system. The resources of the communication system are shared among a plurality of user terminals. In this method, the network responds to requests for network resources from a newly accessing user terminal, or for additional network resources from a currently accessing user terminal, so long as the requests are authorized, by making the requested network resources immediately available from network resources including a pool of nominally unused network resources. The network also from time to time readjusts the network resources allocated among all of at least some sets of user terminals of the network, in a manner which tends to maintain the pool of nominally unused network resources at a given level. The network also transmits commands to the user terminals, commanding the user terminals to reduce the rate of the requests for additional network resources, in response to emptying of the pool below a desired level. The method comprises the step, at the user terminal, of responding to the commands to reduce the rate by increasing the interval between successive requests for network resources.

BRIEF DESCRIPTION OF THE DRAWING

FIG. 4 is a chart or table aiding in the understanding of one possible processing scenario for determining the reallocation of network resources for equal allocation, so long as the allocation does not exceed the requested resources.

DESCRIPTION OF THE INVENTION

Figure 1:
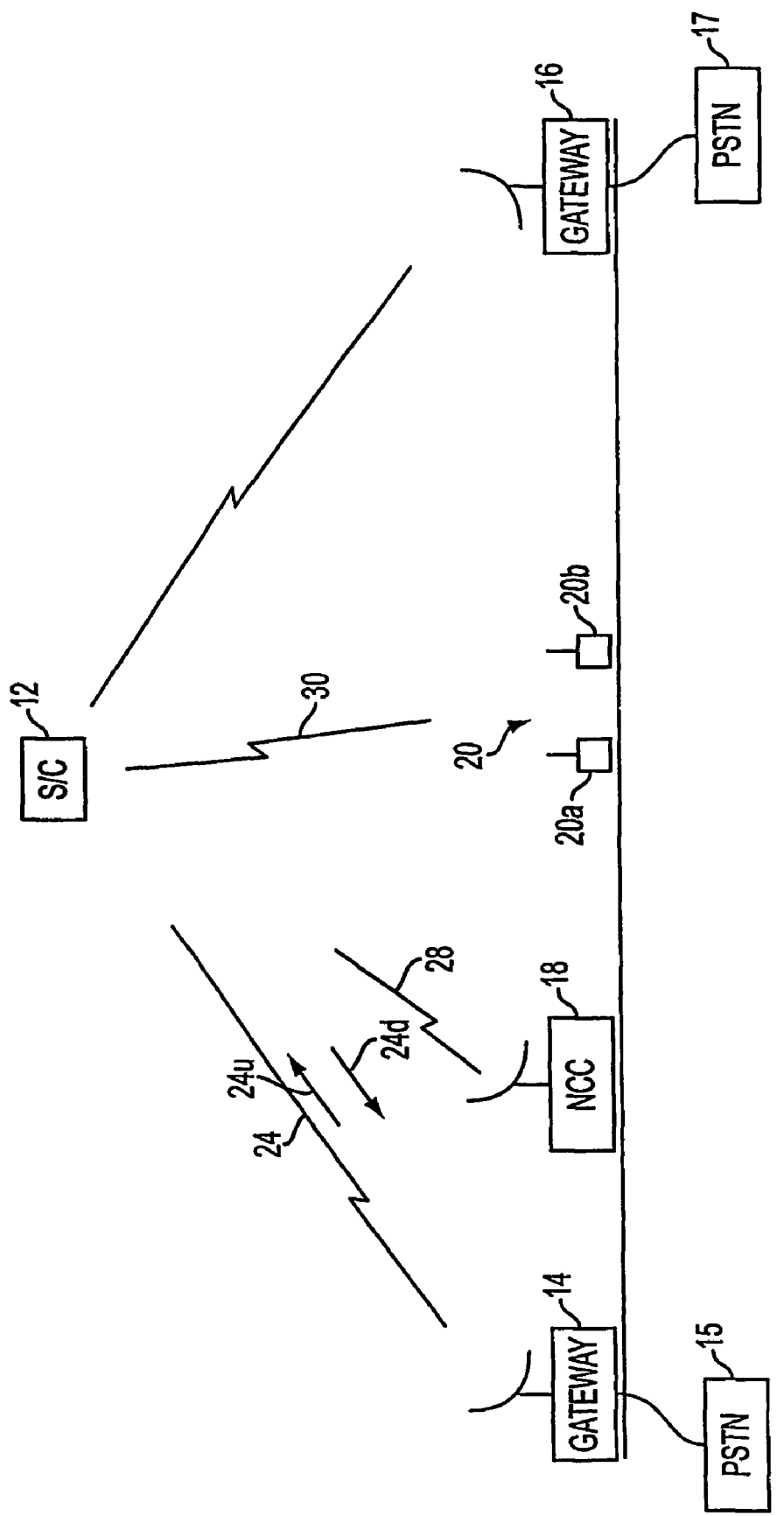
FIG. 1 is a simplified block diagram of a prior-art satellite-based network communication system according to an aspect of the invention.

In FIG. 1, a spacecraft or satellite-based network communication system 10 includes a spacecraft 12, which communicates with a plurality of gateways, two of which are illustrated a 14 and 16, with a Network Communication Center designated 18, and with a plurality of cellular telephones, two of which are illustrated as 20a and 20b. Such systems are well known, and are described, for example, in U.S. Pat. No. 5,717,686, issued Feb. 10, 1998 in the name of Schiavoni; U.S. Pat. No. 5,875,182, issued Feb. 23, 1999 in the name of Hatzipapafoutiou; U.S. Pat. No. 5,907,541 issued May 25, 1999 in the name of Fairholin et al.; U.S. Pat. No. 5,974,314, and 5,974,315, both issued Oct. 26, 1999 in the name of Hudson; U.S. Pat. No. 6,014,372, issued Jan. 11, 2000 in the name of Kent et al.; U.S. Pat. No. 6,072,985, issued Jun. 6, 2000 in the name of Wismer, U.S. Pat. No. 6,118,998, issued Sep. 12, 2000 in the name of Wismer et al.; and U.S. Pat. No. 6,212,378, issued Apr. 3, 2001 in the name of Wismer. In the arrangement of FIG. 1, a public switched telephone system (PSTN) 15 is illustrated as being connected to gateway 14, and a PSTN 17 is connected to gateway 16. Telephone calls initiated by a user connected to PSTN 15 and destined for a user connected to PSTN 17 may be routed by way of gateway 14 and an uplink/downlink illustrated as a "lightning bolt" symbol 24 to spacecraft (S/C) 12, through the spacecraft, and by way of an uplink/downlink path illustrated as 26 to a gateway 16 and thence to PSTN 17. On the other hand, if the destination of the telephone call initiated by a user attached to PSTN 15 happens to be a cell-phone user 20a or 20b, the call is routed through gateway 14, uplink/downlink 24, spacecraft 12, and an uplink/downlink 30 to all the cell-phone subscribers such as 20a or 20b who happen to be in the particular satellite spot beam represented by lightning bolt symbol 30. Since all of the cell phone users or subscribers represented by 20a and 20b receive the same messages, it is necessary to provide addressing of the various messages to allow each cell phone subscriber to ignore messages destined for another, and to identify messages directed or destined for itself This addressing, of course, identifies the user or subscriber's cell phone, and not any particular location. Such addressing is known in the art, and may be, for example, by means of subscriber addresses associated with message headers.

In the arrangement of FIG. 1, a Network Control Center (NCC) 18 communicates with the spacecraft by way of an uplink/downlink designated 28. NCC 18 provides the overall system control necessary to identify the spot beams in which the various subscribers are likely to be found, assigns network resources such as frequency allocations and time slots in a time division multiple access (TDMA) system with multiple carriers, or codes and frequency allocations in a system using code division multiple access (CDMA). The NCC 18 can itself perform, or interact with the remainder of system 10 to perform, various sophisticated control arrangements for enhancing system throughput, reducing latency, and the like.

Figure 2A:
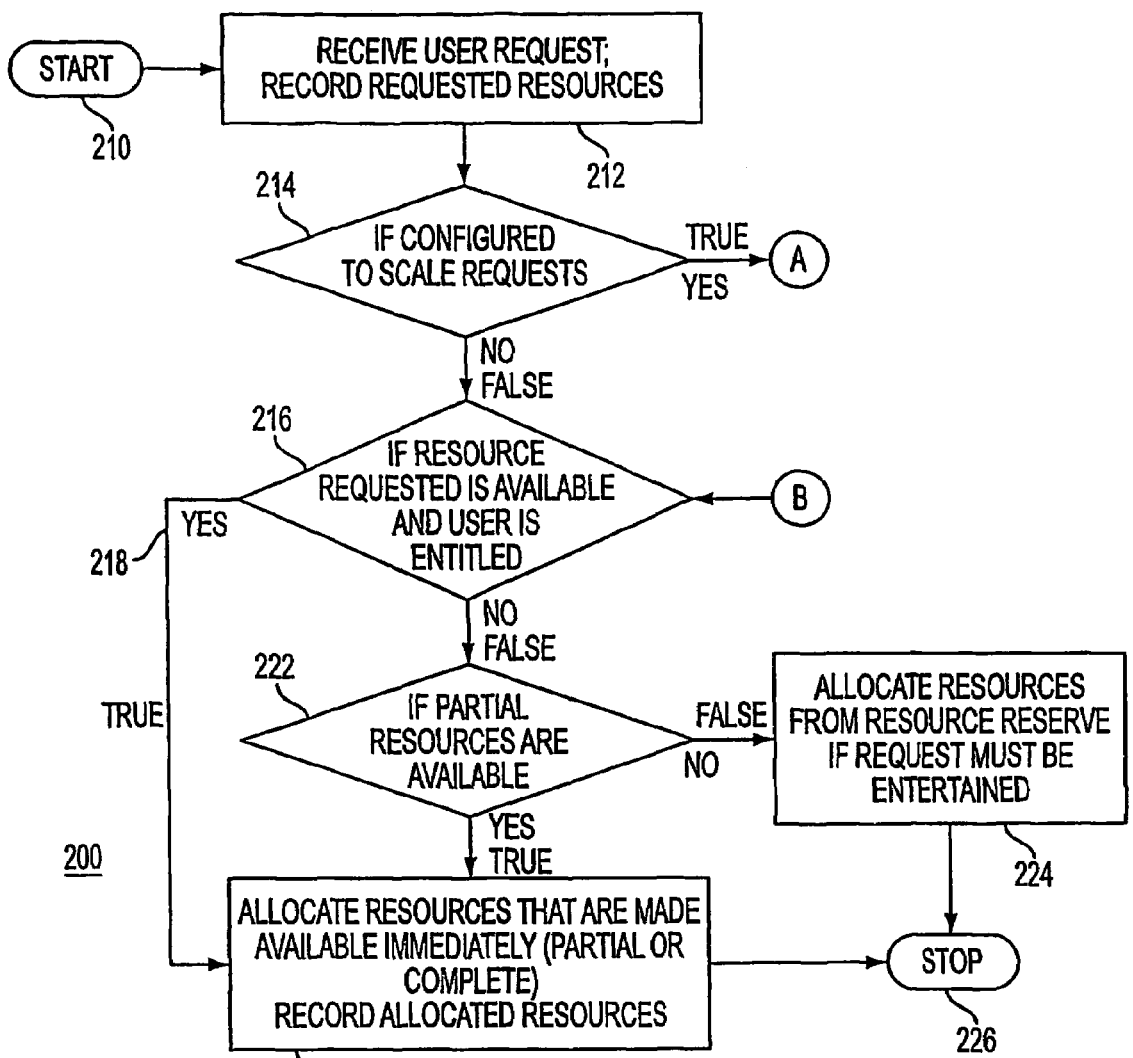
FIG. 2a is a simplified logic diagram or chart illustrating a portion of the logic at the network for handling new requests or modified requests from user terminals for network resources.

FIG. 2a is a simplified logic diagram or chart illustrating a portion of the logic at the network for handling new requests or modified requests from user terminals for network resources. In FIG. 2a, the logic begins at a START block 210, and proceeds to a block 212, which represents waiting until there is a user or user terminal request for network resources. This request may be from a user-newly accessing the network, or it may be a request for resources from a user already currently on-line on the network. In this latter case, the request may be for additional resources, or for resources less than those already allocated. Upon receipt of the request for network resources, block. 21 causes recordation of the user's identification and of the requested resources. The requested resources may represent bandwidth, slot time, or both, or other network resources. From block 212, the logic of FIG. 2a flows to a decision block 214. Decision block 214 determines if the network is configured to do request scaling. Request scaling is a procedure whereby the magnitude of a request is compared with the magnitudes of a representative sample of previous requests, or possibly with all currently active requests, to determine if it is so out of line with, or much larger than, the other requests, that such an allocation could be expected to be reduced during the next occurrence of a reallocation. If the configuration is one of scaling, the logic leaves decision block 214 by the "True" or YES block, and flows to logic node A of FIGS. 2b and 2d. If the configuration is not set for scaling, the logic leaves decision block 214 by the "False" or NO output, and arrives at a further decision block 216. Decision block 216 determines if the requested resources are available. The answer should always be YES if the request is for reduction of the allocated resources, in which case the logic would leave decision block 216 by the YES output, and arrive by way of a logic path 218 at a block 220. If the request is for a new or increased allocation of network resources, decision block 216 may still decide that the resources are available, in which case the logic leaves decision block 216 and flows to block 220 by way of logic path 218. On the other hand, if decision block 216 finds that the resources are not available, the logic leaves by way of the NO or "False" output and arrives at yet another decision block, namely block 222.

Decision block 222 of FIG. 2a determines if partial resources are available, and if not, the logic leaves decision block 222 by the NO or "false" output, and arrives at a block 226. Block 226 represents allocation of resources from a resource reserve if the request must be honored. From logic block 224, the logic flows to a STOP block 226. If decision block 222 determines that resources are available, the logic leaves by way of the YES or "true" output, to arrive at block 220. The logic can arrive at block 220 from either block 216 or block 222 of FIG. 2a Logic block 220 represents the immediate allocation of either partial or complete resources to the requesting user, and recordation of allocated resources for the identified user. From block 220, the logic flows to logic STOP block 226.

Figure 2B:
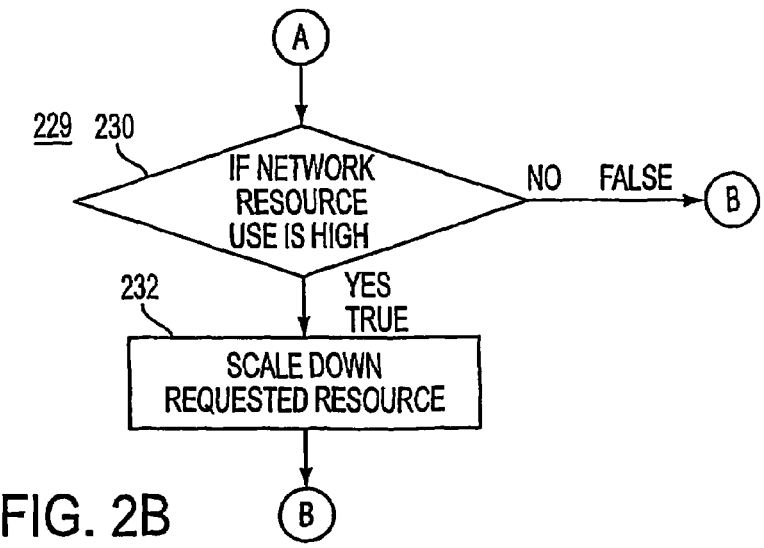
FIG. 2b is a simplified logic diagram or flow chart illustrating the logic associated with the scaling of requests.

FIG. 2b is a simplified logic diagram or flow chart illustrating the logic associated with the scaling of requests. In FIG. 2b, the logic arrives at a decision block 230, which determines if the network resource usage is high. If the network usage is high, the logic leaves decision block 230 by the NO or "false" output, and proceeds by way of node B back to decision block 216 of FIG. 2a If the scaling threshold is exceeded, the logic leaves decision block 230 by the YES or "true" output, and flows to a block 232. Block 232 represents the scaling of the requested resource, which is to say reducing the effective value of the requested resource. From block 232, the logic flows by way of node B back to decision block 216 of FIG. 2a.

Figure 2C:
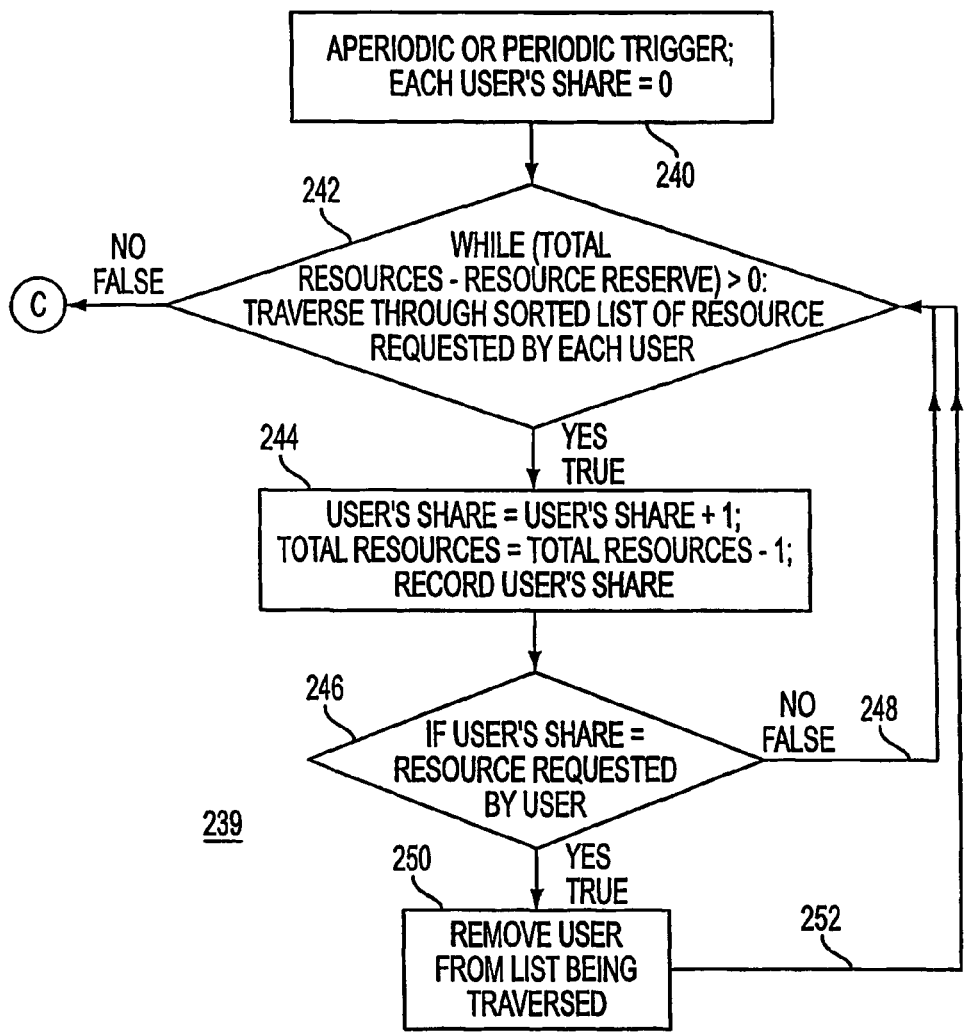
FIG. 2c is a simplified logic flow chart or diagram illustrating logic which may be used to perform reallocation of the network resources among users of the same class.

FIG. 2c is a simplified logic flow chart or diagram illustrating logic which may be used to perform reallocation of the network resources among users of the same class, or of the only class if single-class operation is involved. It should be emphasized that the logic of FIG. 2c relates only to calculation of the resource allocation, and the actual allocation is performed after the logic has determined what the allocation is to be. In FIG. 2c, the logic begins with block 240, which represents the generation of a trigger which begins the reallocation process. The trigger occurs from time to time, by which is meant either a periodic triggering, a triggering which is aperiodic, or which is triggered by some external condition or state which translates into time-to-time or occasional occurrence. From block 240, the logic of FIG. 2c flows to a block 242, which determines if (total network resources−resource reserve)>0, which simply means that there are no resources other than the resource reserve, in which case the logic leaves decision block 242 by the No or "false" output, and flows to node C of FIG. 2d. The (total resources−the magnitude of the reserve) is simply a measure of the total network resources, regardless of whether they are currently in use or not, which are not maintained in the network resource reserve. On the other hand, if the (total network resources−resource reserve)≦0, which means that there are ample network reserves without considering the resource reserve, the logic leaves decision block 242 by the YES or "true" output. In taking the YES output of decision block 242, the logic is embarking on a traversing in succession through the list of resources requested by each user currently using the network. From the YES output of decision block 242, the logic flows to a block 244. Block 244 represents the incrementing of the USER'S SHARE parameter to USER'S SHARE+1, and the decrementing of the TOTAL RESOURCES parameter to TOTAL RESOURCES−1. These incrementings and decrementings represent the effect on the allocated resources of each traversal of the logic of FIG. 2c. From block 244, the logic flows to a decision block 246, which represents a determination, for the current user, if his allocated share is equal to that which was requested by that user. If the current value of USER'S SHARE equals the requested share, the logic leaves decision block by the NO output, and proceeds by way of a logic path 248 back to decision block 242. Eventually, with an incrementing of the USER'S SHARE at each iteration around the logic loop including elements 242, 244, 246, and 248, the USER'S SHARE will eventually equal that originally requested by that user, as recorded in conjunction with block 212 of FIG. 2a. At that time or iteration, the logic will leave decision block 246 by way of the YES or "true" output, and arrive at a block 250, which represents removal of the particular user from the list of those users being considered in the logic loop. From block 250, the logic returns to decision block 242 by way of a logic path 252, to continue evaluating the share of other users, which may have had recorded requests for larger amounts of network resources.

Figure 2D:
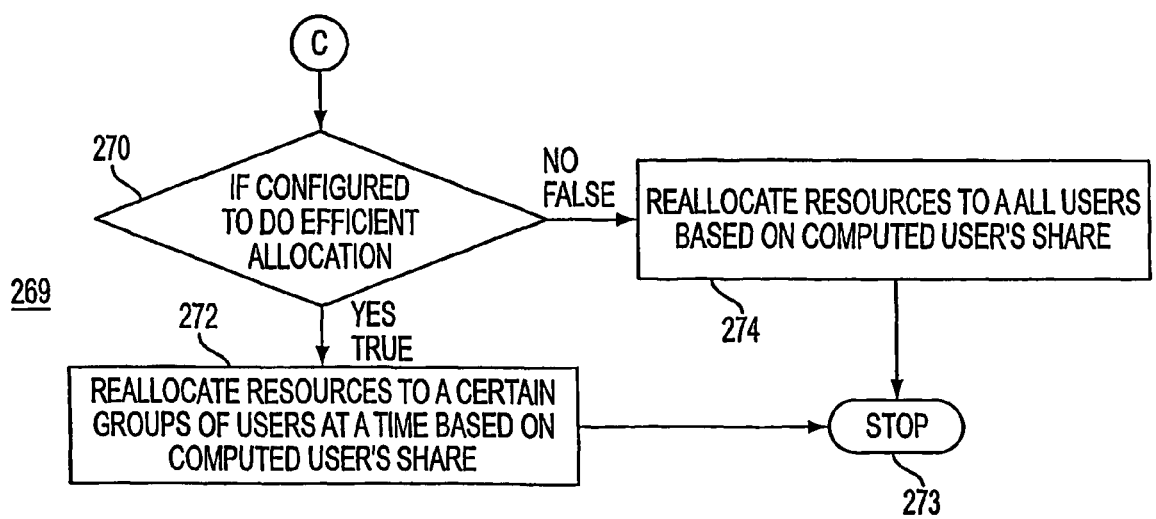
FIG. 2d is a simplified logic flow chart or diagram illustrating logic for selecting between simultaneous reallocation and rolling reallocation of network resources.

In FIG. 2d, the logic arrives at node C from the NO output of decision block 242 of FIG. 2c so long as system resources exist which are not in the resource reserve. From node A, the logic flows to a decision block 270, which determines if the logic is configured to perform "efficient" allocation, where the term "efficient" means that the logic required to determine the allocable shares runs continuously, but the actual allocations are performed on (or for) fewer than all the users at each iteration cycle of the logic of FIG. 2c. To put it another way, it takes several iterations of the logic of FIG. 2c to result in reallocation of all of the users, so each iteration of the logic of FIG. 2c may be considered to be a subset of a complete readjustment interval or subreadjustment interval. It may of course occur that the determination made by the logic of FIG. 2c of the allocation for a particular user may change during subreadjustment intervals during which no adjustment of the allocation of that user is actually performed. This has the advantage of not making major changes in the allocations during every cycle, thereby tending to provide more system stability. In addition, the rolling reallocation reduces the instantaneous network load represented by the signals ordering the reallocation of all of the currently active users at each cycle of the logic of FIG. 2c.

If the logic is not configured to perform efficient reallocation, the logic leaves decision block 270 of FIG. 2d by the NO output, and flows to a block 274, which represents reallocation of the network resources among all the users based on the user's share of the resources as determined during the current iteration of the logic loop of FIG. 2c. On the other hand, if the logic is configured for efficient reallocation, the logic leaves decision block 270 by the YES output, and arrives at a block 272, which represents the performing of the reallocation according to the determinations of the current iteration of the logic loop of FIG. 2c for only a subset of all of the on-line users. Of course, block 272 must also represent maintenance of a record of those users which were most recently reallocated, so that all other current users may be reallocated before returning to one recently done. From either block 272 or 274, the logic flows to a STOP block 273.

Figure 2E:
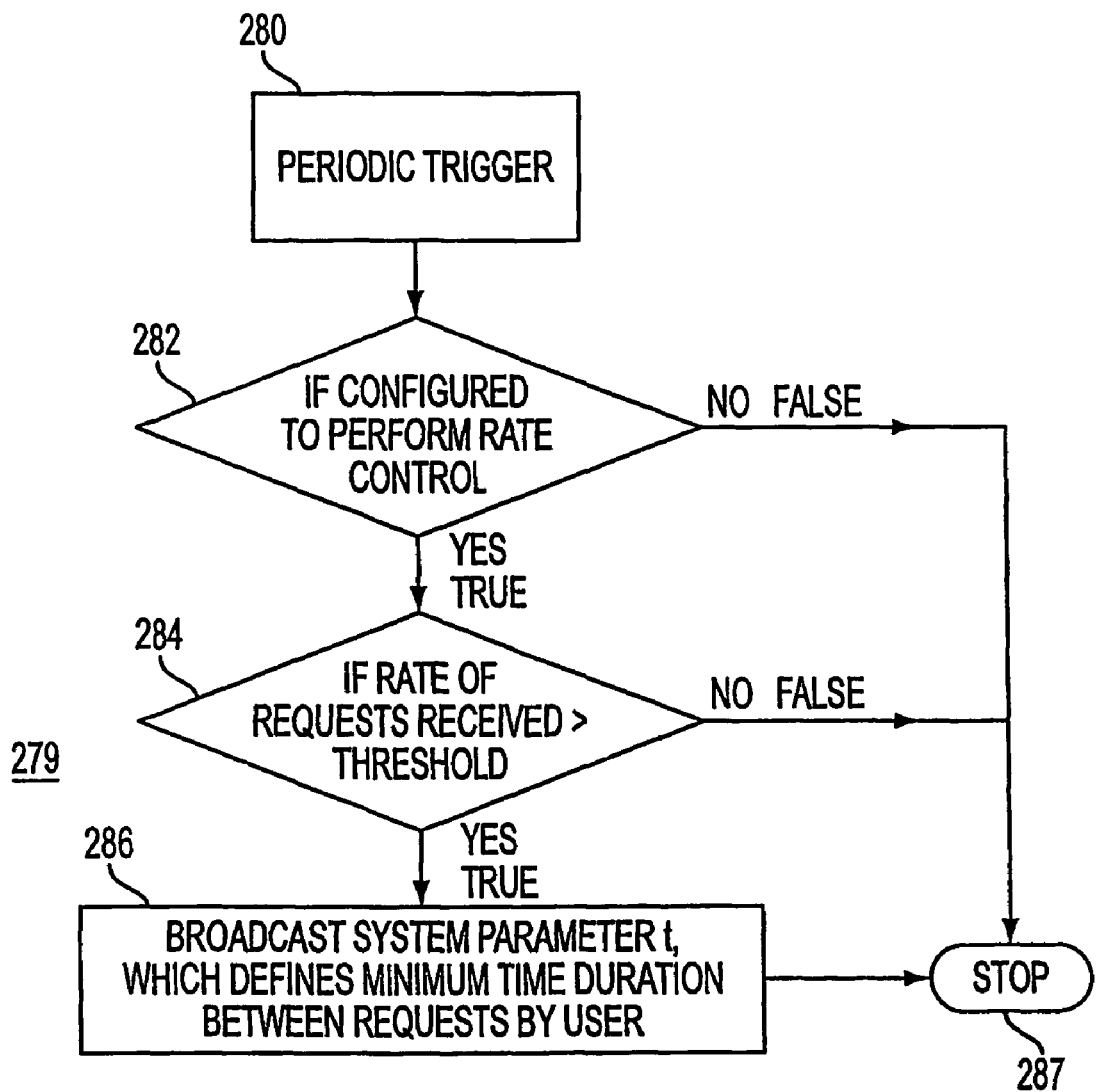
FIG. 2e is a simplified logic flow chart or diagram illustrating logic for determining whether to command users to reduce the rate of requests for network resources.

According to a further aspect of the invention, the network control may monitor the current status of the network resource pool or reservoir which is maintained to provide for immediate allocation of resources to new users. In FIG. 2e, the logic starts at a periodic (or aperiodic, if desired) trigger block designated 280, and flows to a decision block 282. Decision block 282 determines if the system is configured to perform rate control, which in general will be whenever network resources decrease below a given level, or when congestion of some sort occurs. If the system is not configured for rate control, the logic leaves decision block 282 by the false or No output, and proceeds to a STOP block 287. If configured for rate reduction, the logic leaves decision block 282 by the YES or True output, and arrives at a further decision block 284. Decision block 284 determines whether the rate of request for resources exceeds a given threshold. If the rate of requests for resources does not exceed the threshold, the logic leaves decision block 284 by the NO or False output, and flows to STOP block 287. On the other hand, if the rate of receipt of requests for network resources exceeds the threshold, the logic leaves decision block 284 by the YES or True output, and flows to a logic block 286. Logic block 286 represents the broadcasting of a parameter t, which represents the minimum time increment between requests by any user for a change of resources. It has no effect on a new user, which does not have any prior request to which the time increment could be applied. From block 286, the logic flows to STOP block 287.

Figure 3:
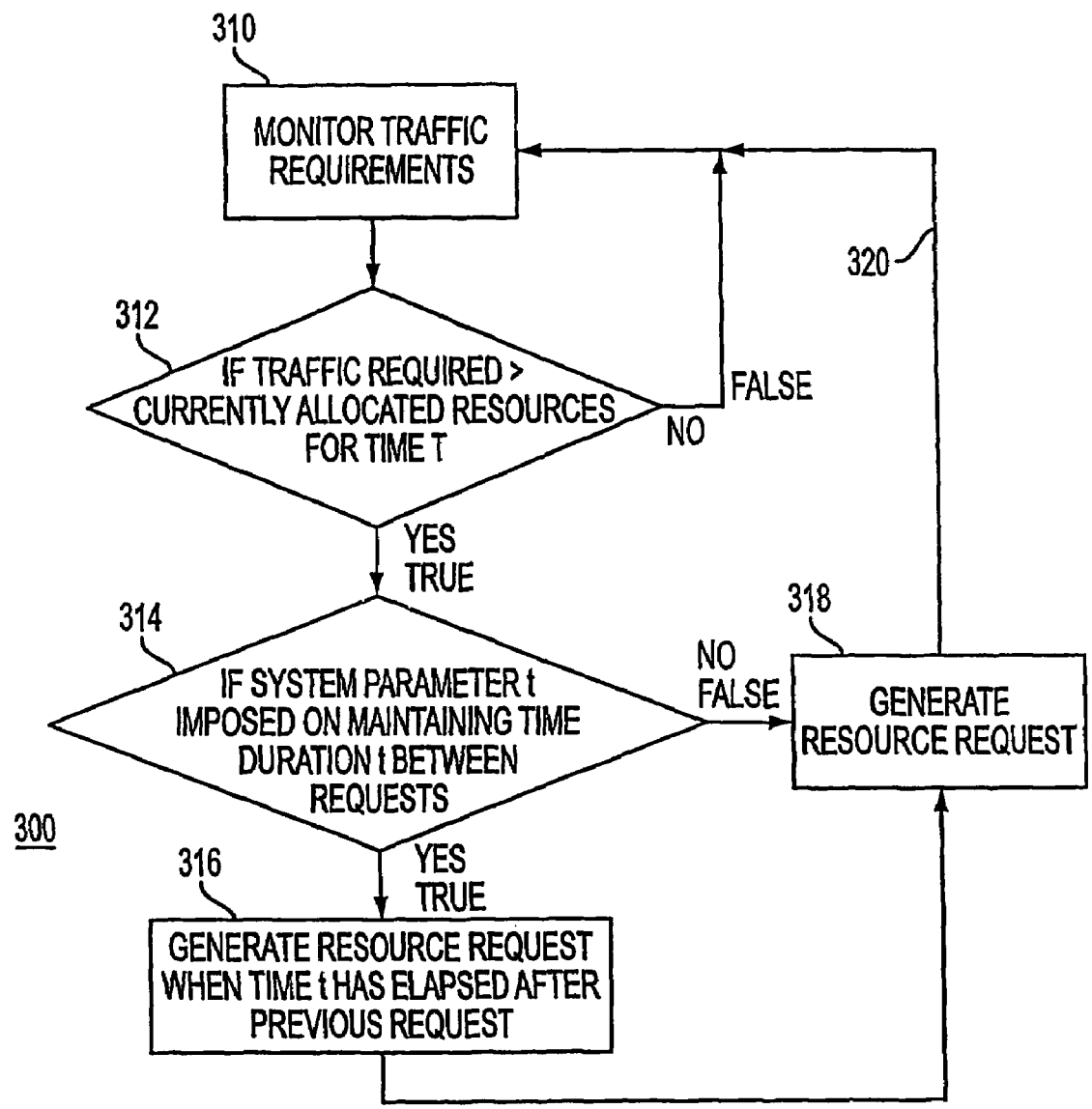
FIG. 3 is a simplified logic flow chart or diagram illustrating the logic flow within a user terminal of a communication system of FIG. 1 in response to broadcast of a command to reduce the rate of requests generated in the logic of FIG. 2e.

FIG. 3 is a simplified logic flow chart or diagram illustrating the logic flow 300 within a user terminal such as 20a of FIG. 1 in response to broadcast of a system parameter t by the network logic of FIG. 2d. In FIG. 3, the logic operates in a continuous loop, with block 310 performing continuous monitoring of the network resource requirements of the particular user in question. From monitoring block 310, the logic flows to a decision block 312, which determines if the current traffic requirement of the user is greater than that which the currently allocated network resources will support. If the traffic does not require more resources than those allocated, the logic leaves decision block 312 by the NO or "false" output, and returns to monitoring block 310. If the current traffic requirements cannot be met by the current network resource allocation, the logic leaves decision block 312 by the YES or "true" output, and arrives at a further decision block 314. Decision block 314 determines if the system delay parameter t has been imposed by broadcast from the network. If no system parameter t has been imposed, the logic leaves decision block 314 by the NO or "false" output, and arrives at a block 318, representing the sending to the network of a request for increased network resources. From block 318, the logic returns by path 320 back to the monitor block 310. If, on the other hand, a system parameter t has been broadcast by the network, the logic leaves decision block 314 by the YES or "true" output, and arrives at a block 316. Block 316 represents a delay equal to parameter t, after which the logic flows to block 318, to generate the resource request.

As an example of the operation of the logic, consider the case of six users of the system, namely users a, b, c, d, e, and f User "a" has requested 5 normalized units of network resources, user b has requested 7 units of resources, user c has requested 9 units of resources, user d has requested 10 units of resources, user e has requested 12 units of resources, and user f has requested 14 units of resources, all as set forth in the left two columns of FIG. 4. Assume that the total normalized amount of network resources, both used and unused, is 44 units, as set forth in the bottom row, left column. At the first iteration around the logic loop 239 of FIG. 2c, user a, the first user, is processed first, and has one unit of allocable resource subtracted from its request during the first iteration, leaving four units, as listed in FIG. 4, third column labeled "after first cycle". The second user, namely user b, is processed next, and unity (1) is subtracted from his request of 7, leaving 6. Similarly, users c, d, e, and f each have unity subtracted from their requests, leaving 8, 9, 11, and 13 units of network resources requested, all as set forth in the third column of FIG. 4. So far, in this first six iterations around the loop 239 of FIG. 2c, a total of six units of network resources have provisionally been allocated among the six users. Thus, of the 44 units of network resources, six units have been spoken for, leaving 38, as set forth in the bottom row of the third column of FIG. 4. These six iterations around the loop of 239 of FIG. 2c may be considered to be one "cycle" around the loop, as set forth in the third column heading. The logic of FIG. 2c then starts another, or second, cycle by making another iteration, subtracting unity from the remaining requested network resources of user "a", which reduces the previous 4 units to 3 units, as set forth for unit "a" under the 4th column, headed "after 2nd cycle." This cycle of iterations continues, subtracting unity from the remaining unaccounted requested network resources for units b, c, d, e, and f, leaving them with 5, 7, 8, 10, and 12, respectively, as set forth in the 4th column of FIG. 4, headed "after 2nd cycle." At each cycle, as defined, six units of the total network resources are used in provisional allocations to the six users. Looking to the right to column 7 in the table of FIG. 4, it can be seen that the value of requested resource for user "a" is zero after the 5th cycle. The practical effect of this, looking at the logic of FIG. 2c, is that user "a" will be allocated 5 units of network resources when the logic operation is completed, because it has requested less resources than would be allocated to it were it to be included in further processing. Referring to FIG. 4, it will be seen that user b reaches 0 on the 7th cycle (column 8); it too will receive all the network resources that it has requested.

In FIG. 4, the original total normalized network resources was given as 44 in the example. As mentioned, six units of resource are provisionally allocated at each cycle of six iterations for the six users a, b, c, d, e, and f. Thus, the amount of provisionally unallocated network resources decreases at each cycle of iterations by six units. The provisionally unallocated network resources are 38 after the first cycle, as set forth in column 3; 32 after the second cycle, as in column 4; 26 after the third cycle, as set forth in column 5; 20 after the fourth cycle, as set forth in column 6, and 14 after the 5th cycle, as set forth in column 7. The sixth and seventh cycles take six more each, for a total of twelve, leaving provisionally allocated normalized network resources of only 2 after the 7th cycle, as set forth in column 8. At this point, another fill cycle cannot be completed, because another cycle of provisional allocation would require six more normalized units of unallocated resources, but only two are available. The provisionally allocated resources are 5 units for user "a," 7 units for user b, which correspond with their maximum requests. The remaining users, namely c, d, e, and f, are not allocated their requested network resources, but instead they each receive 8 units, corresponding to the number of iteration cycles before the remaining network resources are cannot sustain another cycle. Thus, each of the users c, d, e, and f are provisionally allocated 8 units of network resources. The remaining 2 units of resources may be viewed as a "remainder" which can be allocated pursuant to some set of rules. For example, the remainder network resources could be distributed among those users having the largest requests, or, as illustrated in FIG. 4, they could be allocated to the single largest requestor, so that the single largest requestor, unit f, would receive 8+2 or a total of 10 units of provisional resources.

According to another aspect of the invention, a "pool" or reservoir of unallocated network resources is maintained, to provide a location from which requests for resources from new users and increased requests for resources from current users can be immediately satisfied. This is easily done, as may be understood by imagining that in FIG. 4, the allocation of resources to user f represents an allocation to the pool. Each reallocation results in bringing the pool back to a given size. This pool can be given preference by assuming that the remainder of provisionally unallocated network resources (that is, the remainder "2" in FIG. 4) is always allocated to the pool.

The system according to the various aspects of the invention provide the advantage of immediate response to authorized requests for resources, thereby avoiding delays in providing resources while the network resources are reallocated among the users. The reallocation, instead of occurring prior to allocation of the requested resources, occurs at a later time. In some situations, the initial allocation of the full requested resources may be in an amount which exceeds the resources which will be allocated after the next following reallocation.

Other embodiments of the invention will be apparent to those skilled in the art. For example, those skilled in the art know that the processing logic may be either serial or parallel, and it may be implemented as all-software, all-hardware, or a mix thereof known as firmware.

Thus, a method according to one mode of the invention is for operating a communication network (10), the resources of which are shared among a plurality of users (20) sharing network resources in a single-class system. The method comprises the steps of (a) responding to requests (212) from (i) a new user for network resources or (ii) from a current user for additional network resources by making the requested resources immediately available (220) to that user and (b) from time to time (240), readjusting the resources (239, 269) allocated among all users (20) of the network. In a particular version of this mode of the invention, the step of readjusting the resources (239, 269) includes the step (274) of tending to allocate equal amounts of the network resources to each of the users (20) of the network. In another particular version of this mode, the step of readjusting includes the step (274) of allocating equal amounts of the network resources to each of the users (20), so long as no user receives more network resources than it has requested (239). In yet another version, the step of readjusting allocates resources (FIG. 4) among the current users (20) in amounts which are responsive to the amount of resources that each has requested. In yet another version, the step of readjusting includes the step (272) of performing the readjustment on a rolling basis, so that not all of the users (20) are readjusted at the same time, but rather over several readjustment intervals. In yet a further version of this mode, a reserve or pool of unused resources is maintained (279, FIG. 4), so that resources are available for immediate use.

A method according to an aspect of the invention is for operating a communications network (10) with a plurality of shared users (20) sharing network resources with a pool or reserve of resources. The method includes the step of responding to requests for additional network resources from any user in a class by making the requested resources immediately available, and taking at least a portion of the resources from the pool or reserve of network resources. Also, the method may include the step of monitoring allocation of the network resources. The method includes the step of, from time to time, reallocating the resources allocated to a given class of service among all users (20) of that class of service of the network. The reallocation may include the step of adjusting the resource allocation so as to tend to maintain a reserve of network resources (FIG. 4) which are available for immediate allocation. The reallocation may be made on a rolling basis (272), so that all of the users (20) are not reallocated simultaneously, but over a period of at least two reallocation subintervals, all the users (20) are reallocated.

A method according to another aspect of the invention is for dynamically allocating network resources in a communication network (10) having a plurality of shared users (20). This method comprises the step of receiving a new request (212) for specified network resources from a user entitled to a given class of service. According to this method, the new request results in a response which verifies that the user is entitled to the specified network resources (216). If the user is entitled to the specified network resources, a determination is made to see if the specified network resources are available (216). In association with the step of determining, if the specified network resources are available (216), immediately allocating to the user the specified network resources (220), and if the specified resources are not available, immediately reallocating to the user, from a network resource reserve, sufficient network resources to make up the specified network resources. If the specific resources are not fully available, immediate allocation is made (222) to the user of so much of the resources as are available. In this method, from time to time (240), the network resources within each class of service are reallocated (239) to tend to (a) allocate the network resources available within each class of service equally (FIG. 4) among all users (20), except (b) not exceeding the requested amount of the resources for any user. In yet a further version of this method, a reserve (the portion of user f of FIG. 4) of unused resources is maintained, so that resources are available for immediate use. The reallocation may be made on a rolling basis (272), so that not all users (20) are reallocated at one time, but all users (20) are reallocated over some number of reallocation sub-intervals.

In a particular version of this method according to another aspect of the invention, if the step of verifying (216) indicates that the requesting user is entitled to use the requested specific resources, the specific resources requested by a requesting user are recorded (212; 220).

A method according to another avatar of the invention is for dynamically allocating network resources in a communication network (10) having a plurality of shared users (20), the method according to this another avatar includes the step of receiving a new request for specified network resources from a user entitled to a given class of service (216). The requested resources may be recorded in conjunction with the receipt of the request. In response to the new request, a verification is made (216) that the user is (or is not, as the case may be) entitled to the specified network resources. If the user is entitled to the specified network resources, a determination is made (216) to see if the specified network resources are available. If the specified network resources are available, the specified network resources are immediately allocated to the user (220). Ideally, the required resources would be made available from a pool (FIG. 4) of unused resources. If the specified resources are not available, sufficient network resources are immediately reallocated to the user, by taking from a reserve or pool of network resources, to make up the specified network resources. If the specific resources are not fully available, so much of the resources as are available are immediately allocated to the user (222). In this method according to another avatar of the invention, from time to time (240), the network resources are reallocated within each class of service (the only class in a single-class system, or within at least one class in a multiple-class system) to tend to (a) allocate the network resources within each class of service equally among all users (20), except (b) not exceeding the requested amount of the resources for any user (FIG. 4). This reallocation from time to time may be periodic or aperiodic (240). The reallocation may include the step of allocating the resources among the users (20) in such a way as to leave a pool of unallocated resources (user f of FIG. 4) which is available for immediate allocation to new users (20) or users (20) requesting additional resources. In a particular version of this avatar, a step of recording the specified resources and the identity of the requesting user are recorded (220) in conjunction with, or after, the step of determining (216, 222). The reallocation may be made on a rolling basis (272), so that all users (20) do not have their network resources reallocated at the same time, but all users (20) are reallocated over a period of two or more reallocation sub-intervals.

According to another hypostasis of the invention, a method for dynamically allocating network resources in a communication network (10) having a plurality of shared users (20) includes the step of receiving a request (212) for modified allocation of network resources from a current network user entitled to a given class of service. If the request is for reduction in the network resources allocated to the user, the network resources allocated to the user are immediately reduced (220). If the request is for an increase in the network resources, a further step is used to verify (216) that the user is entitled (or not entitled) to the increased network resources. If the request is for an increase in the network resources, and if the specified network resources are available, the specified network resources are immediately allocated to the user. If the request is for an increase in the network resources, and the specified resources are not available, sufficient network resources are immediately reallocated to the user, from a network reserve, to make up the specified network resources. If the request is for an increase in the network resources, and if the specific resources are not fully available, so much of the resources as are available are immediately allocated to the user. In this other hypostasis, the network resources are, from time to time, reallocated to tend to equalize the usage of the network resources among users (20) having the same class of service. In this hypostasis, the further step may be made of recording the network resources requested by the user, together with the user's identity. Also in this hypostasis, the step may be made of allocating the total amount of network resources among the various classes of service, so that each class of services has a given amount of network resources, which may differ among the various classes. Within each class of service, at least some of the users (20) entitled to that class of service may be allocated equal amounts of the network resources.

Another method of the invention is for operating a user terminal (20*a*) in a communication system (10). The resources of the communication system are shared among a plurality of user terminals (20). In this method, the network (10) responds to requests for network resources from a newly accessing user terminal, or for additional network resources from a currently accessing user terminal, so long as the requests are authorized (216), by making the requested network resources immediately available (220) from network resources including a pool of nominally unused network resources (FIG. 4). The communication network (10) also from time to time (240) readjusts the network resources allocated among all of at least some sets of user terminals of the network (239), in a manner which tends to maintain the pool of nominally unused network resources at a given level (FIG. 4). The network also transmits commands (t) to the user terminals (279), commanding the user terminals to reduce the rate of the requests for additional network resources, in response to the rate of emptying of the pool or resource, or its excursion below a desired level. The method comprises the step, at the user terminal, of responding to the commands (300) to reduce the rate by increasing the interval between successive requests for network resources.

What is claimed is:

1. A method for dynamically allocating network resources in a communication network having a plurality of shared users, said method comprising the steps of:
   receiving a new request for specified network resources from a user entitled to a given class of service;
   in response to said new request, verifying that the user is entitled to the specified network resources;
   if the user is entitled to the specified network resources, determining if the specified network resources are available;
   in association with said step of determining, if the specified network resources are available, immediately allocating to said user said specified network resources;
   in association with said step of determining, if said specified resources are not available, immediately reallocating to said user, from a network reserve, sufficient network resources to make up said specified network resources;
   in association with said step of determining, if said specified resources are not fully available, immediately allocating to said user so much of said network resources as are available; and
   from time to time, reallocating said network resources within each class of service to tend to (a) allocate said network resources within each class of service equally among all users, except (b) not exceeding the requested amount of said network resources for any user.

2. A method according to claim 1, wherein said method further comprises the step, if said step of verifying indicates that the requesting user is entitled to use the requested specific resources, of recording the specific resources requested by a requesting user.

3. A method according to claim 1, further comprising the step of allocating the total amount of network resources among the various classes of service, so that each class of service has a given amount of network resources, which may differ among the various classes of network services.

4. A method for dynamically allocating network resources in a communication network having a plurality of shared users, said method comprising the steps of:
   receiving a new request for specified network resources from a user entitled to a given class of service;
   in response to said new request, verifying that the user is entitled to the specified network resources;
   if the user is entitled to the specified network resources, determining if the specified network resources are available;
   in association with said step of determining, if the specified network resources are available, immediately allocating to said user said specified network resources;
   in association with said step of determining, if said specified resources are not available, immediately reallocating to said user, from a network resource reserve, sufficient network resources to make up said specified network resources;
   in association with said step of determining, if said specified resources are not fully available, immediately allocating to said user so much of said network resources as are available; and
   from time to time, reallocating said network resources within each class of service to tend to (a) allocate said network resources within each class of service equally among all users, except (b) not exceeding a requested amount of said network resources for any user.

5. A method according to claim 4, further comprising, after said step of determining, the step of recording the specified resources requested and the requesting user.

6. A method for dynamically allocating network resources in a communication network having a plurality of shared users, said method comprising the steps of:
   receiving a request for modified allocation of network resources from a current user entitled to a given class of service;
   if said request is for reduction in the network resources allocated to said user, and immediately reducing the network resources allocated to said user;
   if said request is for an increase in the network resources, verifying that the user is entitled to the increased network resources;
   if said request is for an increase in the network resources, if the specified network resources are available, immediately allocating to said user said specified network resources;
   if said request is for an increase in the network resources, and if said specified resources are not available, immediately reallocating to said user, from a network resource reserve, sufficient network resources to make up said specified network resources;
   if said request is for an increase in the network resources, if said specified resources are not fully available, immediately allocating to said user so much of said resources as are available; and from time to time, reallocating said network resources to tend to equalize the usage of said network resources among users having the same class of service.

7. A method according to claim 6, further including the step of recording the network resources requested by said user, together with the user's identity.

8. A method according to claim 6, wherein said step of reallocating said network resources to tend to equalize the usage among users having the same class of service includes the steps of:

allocating the total amount of network resources among the various classes of service, so that each class of services has a given amount of network resources, which may differ among the various classes;

within each class of service, allocating said given amount of network resources equally among the users entitled to that class of service.

\* \* \* \* \*